(12) United States Patent
Barbuto et al.

(10) Patent No.: US 10,949,848 B2
(45) Date of Patent: Mar. 16, 2021

(54) ACCESS TO ACH TRANSACTION FUNCTIONALITY VIA DIGITAL WALLETS

(71) Applicant: MasterCard International Incorporated, Purchase, NY (US)

(72) Inventors: Frank Charles Barbuto, New Rochelle, NY (US); Wei Xu, Millwood, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 645 days.

(21) Appl. No.: 15/794,538

(22) Filed: Oct. 26, 2017

(65) Prior Publication Data

US 2019/0130409 A1 May 2, 2019

(51) Int. Cl.
| | | |
|---|---|---|
| *G06Q 20/40* | (2012.01) | |
| *G06Q 20/38* | (2012.01) | |
| *G06Q 20/02* | (2012.01) | |
| *G06Q 20/36* | (2012.01) | |
| *G06Q 20/10* | (2012.01) | |
| *G06Q 20/34* | (2012.01) | |

(52) U.S. Cl.
CPC ..... *G06Q 20/40145* (2013.01); *G06Q 20/023* (2013.01); *G06Q 20/10* (2013.01); *G06Q 20/34* (2013.01); *G06Q 20/367* (2013.01); *G06Q 20/382* (2013.01); *G06Q 20/40* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | | |
|---|---|---|---|---|
| 7,379,921 | B1* | 5/2008 | Kiliccote | G06Q 20/401 705/75 |
| 7,680,737 | B2* | 3/2010 | Smith, Jr. | G06Q 20/105 379/112.06 |
| 7,788,183 | B2* | 8/2010 | Romney | G06Q 20/367 705/65 |
| 8,315,952 | B2* | 11/2012 | Algiene | G06Q 20/06 705/67 |
| 8,682,802 | B1* | 3/2014 | Kannanari | G06Q 20/367 705/65 |

(Continued)

FOREIGN PATENT DOCUMENTS

WO  2016/055919 A1  4/2016

OTHER PUBLICATIONS

Elisa Tavilla, "Mobile Payments Industry Workgroup (MPIW), Industry Perspectives on Mobile/Digital Wallets and Channel Convergence", Federal Reserve Bank of Boston, March . (Year: 2015).*

(Continued)

*Primary Examiner* — Frantzy Poinvil
(74) *Attorney, Agent, or Firm* — Buckley, Maschoff & Talwalkar LLC

(57) ABSTRACT

A message is generated to initiate an ACH (automated clearing house) transaction to benefit a recipient account associated with a recipient token. The message includes the recipient token. After the message is transmitted, an authentication message is received. The authentication message indicates authentication of the recipient token. The ACH transaction is implemented in response to receiving the authentication message.

20 Claims, 8 Drawing Sheets

(56) References Cited

U.S. PATENT DOCUMENTS

| | | | | |
|---|---|---|---|---|
| 8,732,023 B2* | 5/2014 | Mikurak | ............. | G06Q 10/087 705/22 |
| 8,751,391 B2* | 6/2014 | Freund | ................ | G06Q 20/342 705/41 |
| 8,851,366 B2* | 10/2014 | Modi | .................... | G06Q 20/10 235/379 |
| 8,930,271 B1* | 1/2015 | Ellis | .................. | G06Q 30/0224 705/41 |
| 9,037,509 B1* | 5/2015 | Ellis | .................. | G06Q 30/0255 705/41 |
| 9,655,778 B2* | 5/2017 | Tyler | .................. | A61F 9/00781 |
| 2005/0240771 A1* | 10/2005 | Ginter | .................... | G07F 9/026 713/176 |
| 2006/0136332 A1* | 6/2006 | Ziegler | .................. | G06F 21/36 705/39 |
| 2013/0238492 A1* | 9/2013 | Muthu | ................ | G06Q 20/385 705/39 |
| 2014/0095383 A1* | 4/2014 | Rao | ..................... | G06Q 20/385 705/43 |
| 2014/0337214 A1* | 11/2014 | Henry | ................. | G06Q 20/102 705/43 |
| 2015/0112862 A1 | 4/2015 | Kheradpir et al. | | |
| 2015/0112866 A1* | 4/2015 | Muthu | ................ | G06Q 20/385 705/44 |
| 2016/0140546 A1* | 5/2016 | Taratine | ............... | H04W 4/029 705/76 |
| 2016/0162873 A1* | 6/2016 | Zhou | ................... | G06F 3/04883 705/67 |
| 2017/0004501 A1 | 1/2017 | Ledford et al. | | |

OTHER PUBLICATIONS

Harry Leinonen, "Fundamental competition and market practice impacts of real-time payments", Journal of Payments Strategy & Systems, vol. 11, No. 1, pp. 48-57 (Year: 2017).*

"PCT Notification of Transmittal of the International Search Report and the Written Opinion", International Searching Authority, Nov. 30, 2018 (Nov. 30, 2018), International Application No. PCT/US2018/052147, 12pp.

"Communication pursuant to Rules 161(1) and 162 EPC—Written Opinion", dated Jun. 3, 2020 (Jun. 3, 2020), European Patent Office, for European Application No. 187833011-1213, 3pgs.

* cited by examiner

ACCESS TO ACH TRANSACTION FUNCTIONALITY VIA DIGITAL WALLETS

BACKGROUND

Automated clearing house (ACH) payment networks are configured to primarily transfer money electronically from one bank account to another, either within a single financial institution or across multiple institutions. An ACH network typically utilizes one or more computer-based systems without the direct intervention of bank staff to transfer funds, and the accounts can either be commercial accounts or consumer accounts. ACH networks are an example of electronic funds transfer (EFT) systems.

The present inventors have recognized opportunities for improving convenience of use of ACH networks, particularly for consumers, while also reducing chances for erroneous transactions.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

In general, and for the purpose of introducing concepts of novel embodiments described herein, tokens may be issued to facilitate access to ACH functionality. Access to the tokens, in turn, may be facilitated by storing them in consumers' digital wallets. In launching ACH transactions with tokens, authentication processes may be employed to allow the transaction/funds sender to confirm that the selected token belongs to the intended funds recipient. A facility may also be provided to supply to transaction senders the tokens that correspond to desired transaction recipients.

With some or all of these features, users may conveniently initiate ACH transactions from their digital wallets, and may receive a high degree of assurance that there has been no error in entering the token used to designate the ACH transaction recipient.

Figure 1:
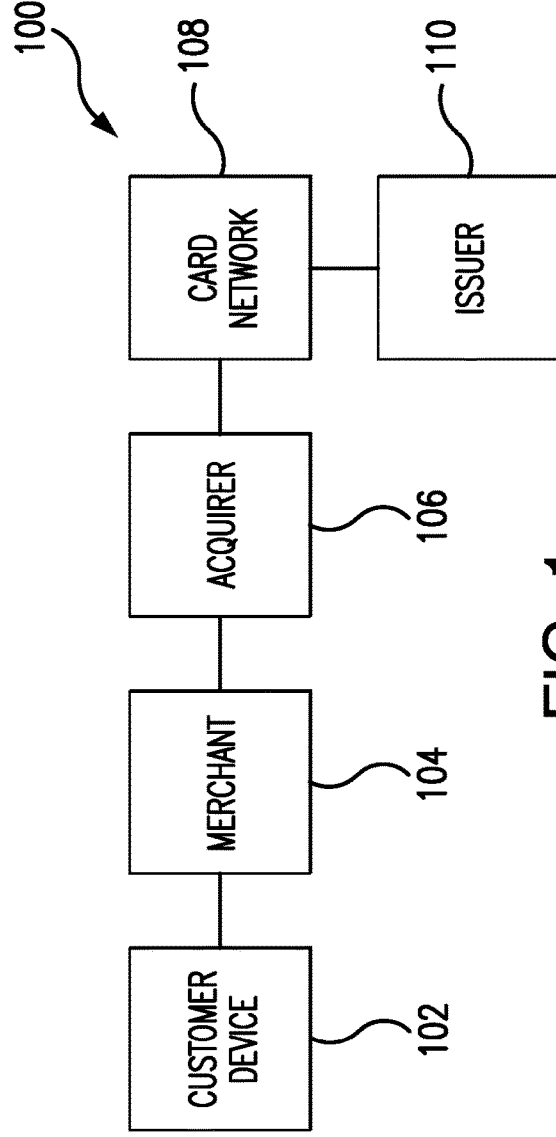
FIG. 1 is a block diagram illustrating a payment card account system.

FIG. 1 is a block diagram that illustrates a payment card system 100. The payment card system 100 includes a customer device 102 such as a magnetic stripe card, a payment IC (integrated circuit) card (contactless and/or contact), or a payment-enabled mobile device (such as a smartphone that includes a payment application), a merchant device 104, an acquirer financial institution (FI) computer 106, a card network 108, and an issuer FI computer 110.

The merchant device 104 may be, for example, a POS (point of sale) terminal/card reader or a merchant mobile device (i.e., a smartphone), and may also be considered part of the payment card account system 100. The customer device 102 may be presented to the merchant device 104 to consummate a purchase transaction and to permit the merchant device 104 to read payment card account data (including, for example, a payment account number) from the customer device 102. In other situations, the merchant device 104 may be an e-commerce server computer, and the customer device 102 may be a personal computer or a mobile device running mobile browser software or the like. In this case, the customer device 102 may engage in an online shopping session with an e-commerce website hosted by the merchant device 104.

During a purchase transaction, the acquirer FI computer 106 may receive a payment account system authorization request message for the transaction from the merchant device 104. The acquirer FI computer 106 may then route the authorization request message via a card network 108 to an issuer FI computer 110, which is operated by the issuer of a payment account that is associated with the account number obtained by the merchant device 104 (e.g., from the customer device 102) and included in the authorization request message. In some implementations, the authorization response message generated by the payment issuer server computer 110 is routed back to the merchant device 104 via the card network 108 and the acquirer FI computer 106.

One well known example of a payment card network is referred to as the "Banknet" system, and is operated by Mastercard International Incorporated, the assignee of the present application.

Referring again to FIG. 1, the payment account issuer FI computer 110 may be operated by or on behalf of a financial institution, such as a bank, that issues payment accounts to individual users (such as the customer or consumer who presented or operated the customer device 102 referred to above). For example, the payment card issuer FI computer 110 may perform such functions as (a) receiving and responding to requests for authorization of payment account transactions to be charged to payment accounts issued by the FI; and (b) tracking and storing transactions and maintaining account records.

The payment card account system communications among the merchants, acquirers, card network and/or issuers may conform to a known standard such as ISO 8583.

In some instances, the user may select a payment account number or the like from the user's digital wallet for presentation to the merchant. The digital wallet may reside in the customer device 102 or in a remote server (not shown), such as a wallet service provider (WSP) server.

It should be understood that the components shown in the system 100 of FIG. 1 are only those that are needed for processing a single transaction. However, a typical or practical payment system may process hundreds, thousands or more purchase transactions per day (including simultaneous transactions), and thus may include a considerable number of payment account issuers and their computers and/or computer networks, a considerable number of acquirers and their computers and/or computer networks, and numerous merchants and their devices, as well as a very large number of customer devices.

Figure 2:
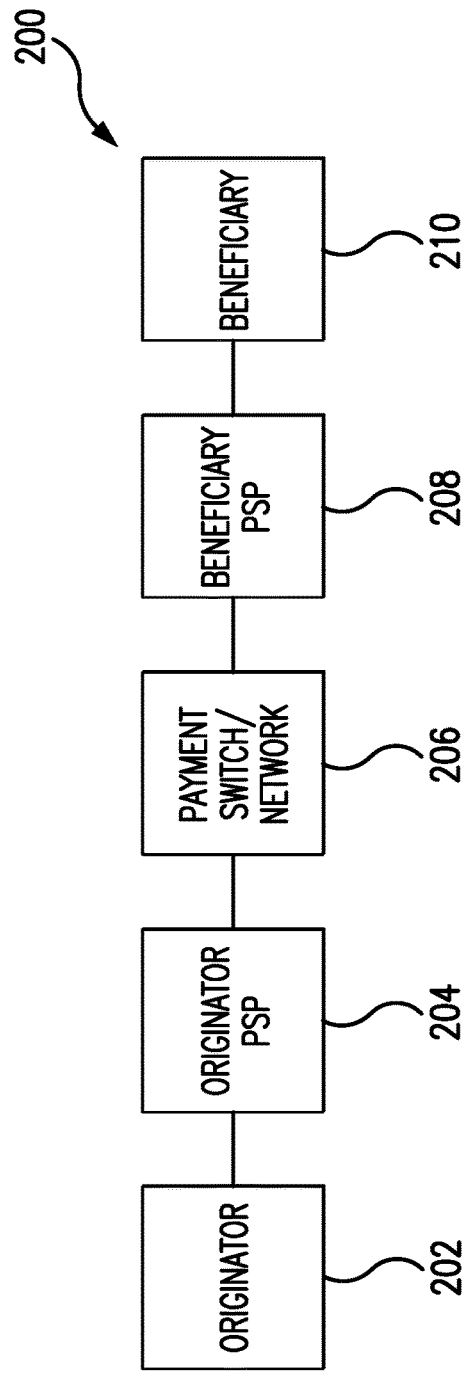
FIG. 2 is a block diagram of an embodiment of a payment network system.

FIG. 2 is a block diagram illustrating a payment network system 200, of which one example is the ACH (automated clearing house) system operated in the United States. (As is known to those who are skilled in the art, an ACH system is an example of an EFT—electronic funds transfer—system.) The payment network system 200 includes an originator device 202, for example, a computer operated by an originator of a transaction. Common types of transactions handled by the payment network system 200 include credit transactions and debit transactions, wherein the originator 202 is the party that initiates the transaction. The originator may be, for example, an individual or a corporation or other organization or entity.

Referring again to FIG. 2, the payment network system 200 also includes an originator PSP (payment services provider) computer 204. The originator PSP computer 204 receives payment instructions from the originator and forwards data entries that reflect the instructions to a payment system switch/network 206, which is also part of the payment network system 200. The originator PSP computer 204 may be operated by an originator PSP (which may be, for example, an originating depository financial institution or "ODFI") of which the originator is a customer. In some embodiments, the switch/network 206 can be operated by a government agency or a private entity that serves as a clearing facility for the system 200.

Also included in the system 200 is a beneficiary PSP computer 208 (which may be, for example, a receiving depository financial institution or "RDFI"). The beneficiary PSP computer 208 receives entries from the payment system switch/network 206 and posts entries to accounts of depositors.

Still further, the system 200 includes a beneficiary 210 that is one of the depositors of the beneficiary PSP. In the case of a credit transaction, the account at the beneficiary PSP of the beneficiary may be credited with the amount instructed to be paid by the originator device 202. The beneficiary may be, for example, an individual or a corporation or other organization. Both the originator and beneficiary PSPs may be banks or other types of financial institutions (FIs).

The communications among the parties in the payment network system 200 may typically be conducted using XML (eXtensible Markup Language) and may comply with a standard according to ISO 20022.

It should be understood that the components of the system 200 as depicted in FIG. 2 are only those that are needed for processing a single transaction. However, a typical payment network system 200 may process many transactions (including simultaneous transactions) and therefore may include a considerable number of PSPs and their computers and/or computer networks, one or more clearing operators, and numerous originators and beneficiaries.

Figure 3:
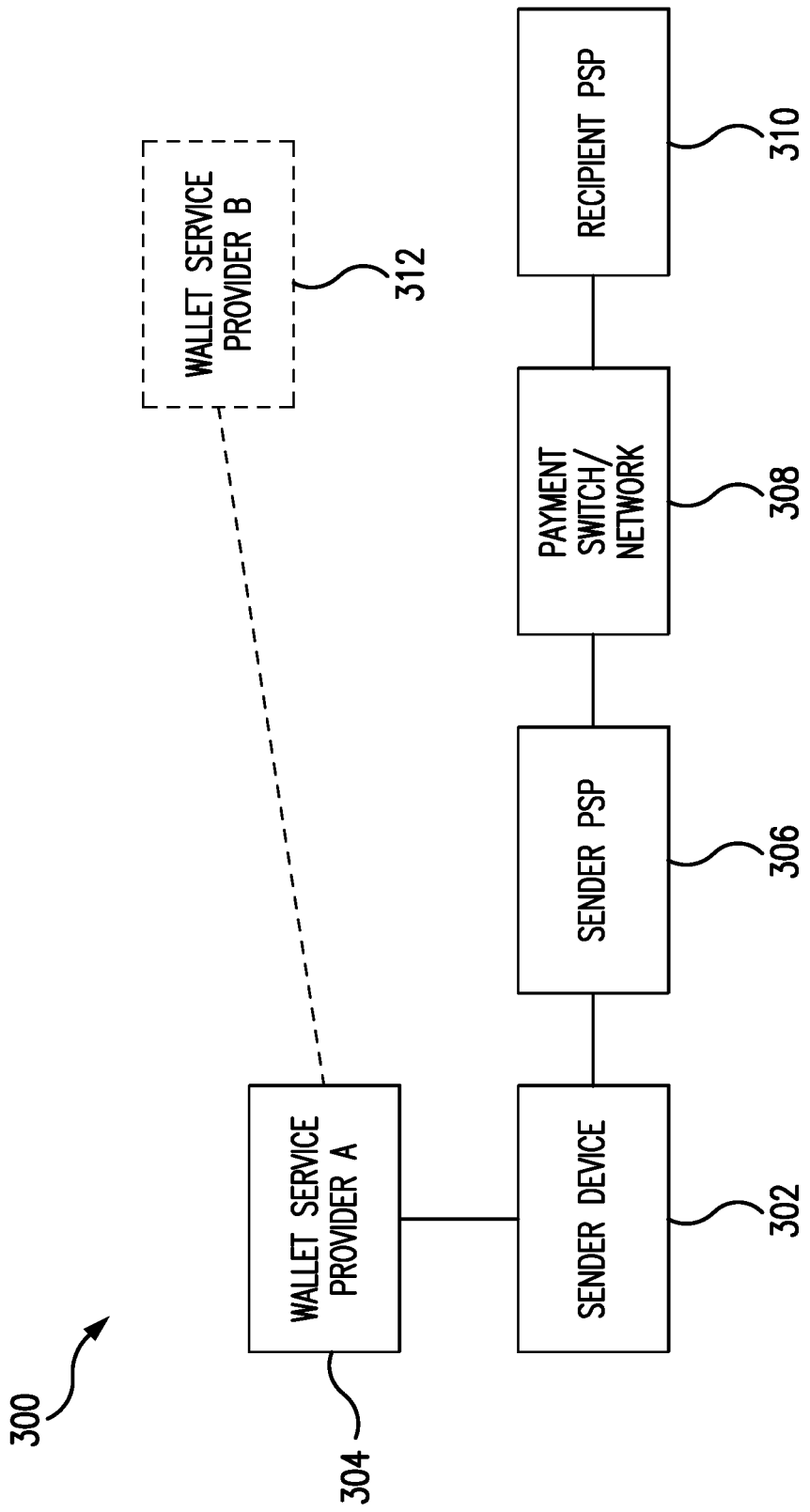
FIG. 3 is a block diagram illustrating a financial transaction system in accordance with some embodiments of the disclosure.

FIG. 3 is a block diagram illustrating a financial transaction system 300 in accordance with some embodiments of the disclosure.

The financial transaction system 300 is illustrated in FIG. 3 in the context of a "P2P" (person-to-person) funds transfer transaction. The financial transaction system 300 includes a sender device 302, which may resemble the originator device 202 discussed above in connection with FIG. 2. In some embodiments, the sender device 302 may be a suitably programmed mobile device operated by an individual ("the sender," not shown) who is initiating the funds transfer transaction to provide funds to another individual ("the recipient," also not shown).

The financial transaction system 300 is further shown as including a wallet service provider (WSP) 304 designated as "WSP A" to distinguish it from one or more other WSPs that may be involved in the funds transfer transaction. It is assumed that there is a relationship between the sender and the WSP A 304 such that the WSP A 304 hosts a digital wallet for the sender. Accordingly, it should be understood that the block labeled 304 also represents a server computer operated by or on behalf of the WSP A 304. In some embodiments, or in some situations, it may be the case that the WSP A also hosts a digital wallet for the recipient. It may be the case, for example, that there is a familial relationship between the sender and the recipient, such that the recipient makes funds transfers for the benefit of the recipient on a regular or frequent basis. For example, the recipient may be a young adult child of the sender. It may be the case that the recipient acquired his/her digital wallet with the WSP A 304 under the auspices of the sender; the recipient's digital wallet may be set up as a sort of "sub-wallet" relative to the sender's digital wallet. As will be seen though, each of the digital wallets referred to in the previous sentence may be separately identified by a respective wallet token. In other embodiments, or in other situations, there may be no particular relationship between the sender and recipient, nor between their respective digital wallets. As will be seen, the sender and recipient need not share the same WSP.

In connection with a funds transfer transaction, the sender device 302 may be in communication with the WSP A 304.

The financial transaction system 300 also includes a sender PSP 306. The sender PSP 306 may provide much the same functionality as the originator PSP 204 discussed in connection with FIG. 2. However, the sender PSP 306 may also be at least a conduit for messaging related to tokenization of the sender and recipient banking details. In connection with a funds transfer transaction, the sender device 302 may be in communication with the sender PSP 306.

The financial transaction system 300 also includes a payment switch/network 308. The payment switch/network 308 may resemble the payment switch/network 206 discussed above in connection with FIG. 2. In addition, the payment switch/network 308 may provide functionality related to tokenization of sender and recipient banking details. For example, the payment switch/network 308 may receive transaction messaging in which the sender and recipient bank accounts are represented by tokens rather than bank account numbers. The payment switch/network 308 may include a token directory (not separately shown) that may support translation of tokens into corresponding bank account numbers. The payment switch/network 308 may also respond to messages that seek to confirm or obtain tokens for desired transaction recipients. In other embodiments, such inquiries may be handled by one or more WSPs, such as the WSP A 304.

The financial transaction system 300 may also include a recipient PSP 310. The recipient PSP 310 may resemble the beneficiary PSP 208 discussed above in connection with FIG. 2.

A WSP B 312 is also shown in phantom in FIG. 3. In some transactions, the WSP B 312 may be the wallet service provider for the recipient and may have a role to play in connection with the funds transfer transaction. In some embodiments, the WSP B 312 may communicate with the WSP A 304.

In some embodiments, the WSP A 304 may be operated by an operator of a payment card account system, such as that illustrated in FIG. 1.

It should be understood that the components of the system 300 as depicted in FIG. 3 are only those that are needed for processing a single transaction. However, a typical financial transaction system 300 may process many transactions (including simultaneous transactions) and therefore may include a considerable number of PSPs and their computers and/or computer networks, one or more clearing operators, and numerous originators and beneficiaries and a number of WSPs.

Figure 4:
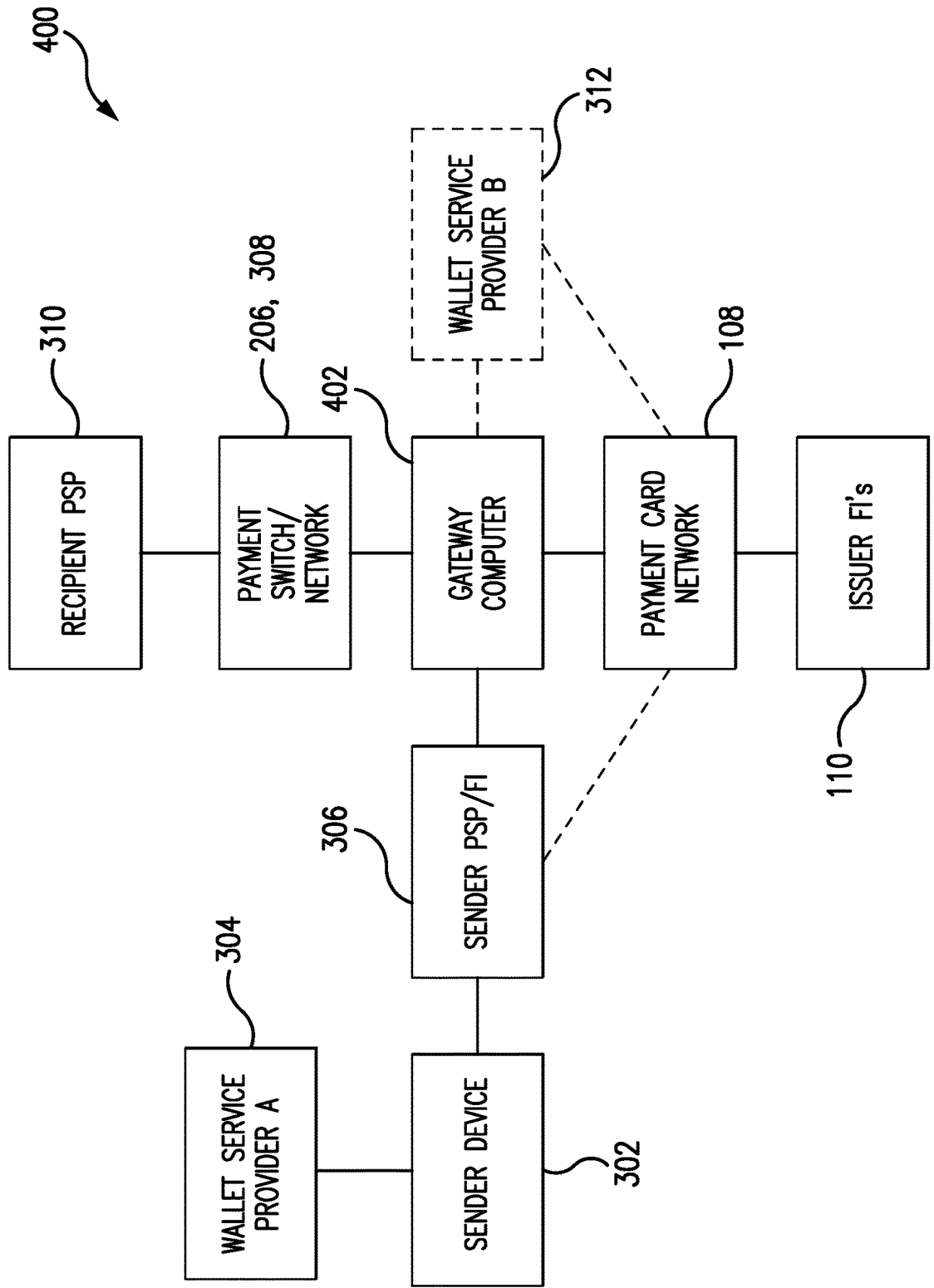
FIG. 4 is a block diagram illustrating another embodiment of a financial transaction system in accordance with aspects of the disclosure.

FIG. 4 is a block diagram illustrating a financial transaction system 400 in accordance with some embodiments. A gateway computer 402 is shown operably connected between a payment card network 108 and a payment switch/network 206 (or 308). It should be understood, however, that in some embodiments the gateway computer 402 may be a component or components associated with and/or provided by and/or operated by the operator of the payment card network 108. In some embodiments, the gateway computer 402 may function as a transaction message switching computer.

As explained above, the payment card network 108 processes credit and/or debit card payments between an acquirer financial institution (FI) 106 (FIG. 1) and an issuer FI 110. The payment card network 108 may also process P2P funds transfer transactions or facilitate ACH-based funds transfer transactions by aiding in token verification, discovery and/or translation. The payment switch/network 206, 308 processes, for example, credit and/or debit transactions between originator PSP computer 204 (FIG. 2) and a beneficiary PSP computer 208. In some embodiments, a consumer utilizes a sender device 302 to initiate transactions. The customer device 302 may be, for example, a payment-enabled mobile device, or a personal computer, or browser-equipped mobile device or a smart device hosting a wallet by which the consumer may initiate funds transfer transactions. To do so, the sender device 302 may communicate with a sender PSP 306, which may be a financial institution (FI), and may be among the issuer FIs separately indicated at block 110 in FIG. 4. In some embodiments, the sender PSP 306 may fulfill the role of the originator PSP referred to in connection with FIG. 2.

The system 400 may also include the WSP A 304 and possibly also the WSP B 312, as referred to above in connection with FIG. 3. The recipient PSP 310—as discussed above in connection with FIG. 3—is also shown as being a component of the system 400.

In some embodiments the gateway computer 402 is configured to bridge the payment switch/network 206 and the payment card network 108 at one or more conceptual and/or physical levels. In addition, the gateway computer 402 may be configured for providing network operators and/or network participants to apply the protocol that best suits their system's optimal performance level(s). Thus, the gateway computer 402 serves as a central switching platform that may be the seat of the network's operations, and works independently of the chosen protocol of the network participants. Further details of an embodiment of the gateway computer 402 are described in commonly-assigned U.S. patent application Ser. No. 15/621,383 (filed Jun. 13, 2017), which is incorporated herein by reference.

It should be understood that the components of the system 400 as depicted in FIG. 4 are only those that are needed for processing a single transaction. However, a typical financial transaction system 400 may process many transactions (including simultaneous transactions) and therefore may include a considerable number of PSPs/FIs and their computers and/or computer networks, one or more clearing operators and payment card networks, and numerous sender devices corresponding to many system users.

Figure 5:
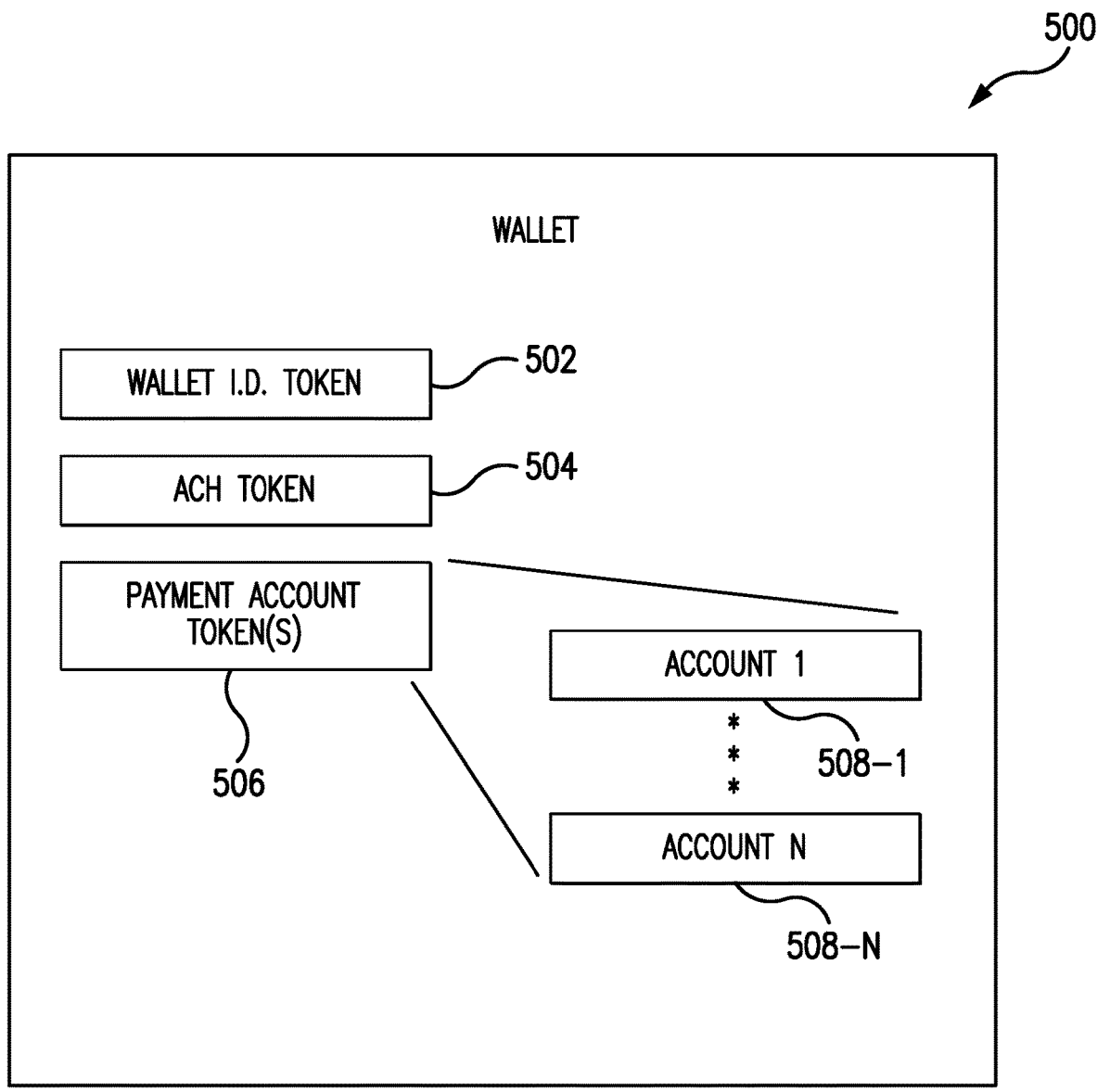
FIG. 5 is a schematic illustration of a digital wallet according to aspects of the present disclosure.

FIG. 5 is a schematic illustration of a digital wallet 500 according to aspects of the present disclosure. The digital wallet 500 may take the form of a dedicated data partition in a database stored in a WSP server. Alternatively, the digital wallet may be maintained locally in a user device, such as a payment-enabled mobile device (not shown in FIG. 5). An example embodiment of such a mobile device will be described below in connection with FIG. 6.

Continuing to refer to FIG. 5, the digital wallet 500 may include the following data elements—(a) a token 502 that represents an identifier for the particular user's digital wallet; (b) an ACH token 504 that is used (in a manner described below) to allow the holder of the digital wallet 500 to initiate ACH funds transfers using a bank account (or other type of account) represented by the ACH token 504; and (c) one or more payment account tokens 506. The payment account tokens 506 may each be mapped to a respective payment card system account (the corresponding accounts indicated at 508-1 to 508-N), such as credit card accounts, debit accounts, prepaid accounts, etc.

In a funds transfer transaction such as that discussed above in connection with FIG. 3, each of the sender and the recipient may have a digital wallet (remotely or locally maintained) like that shown in FIG. 5.

Figure 6:
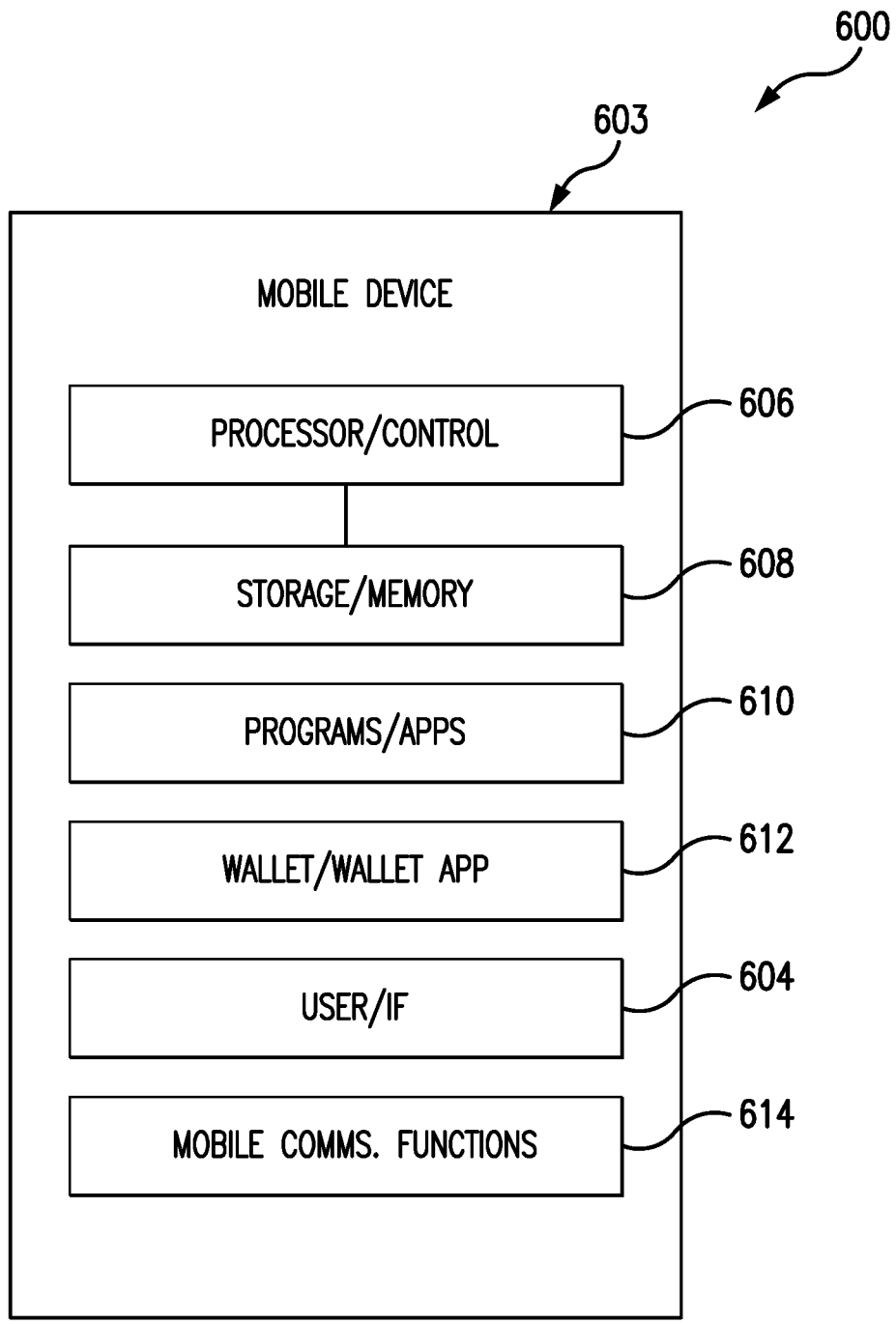
FIG. 6 is a simplified block diagram illustration of a mobile device that may play a role in the system of FIG. 3 or FIG. 4.

FIG. 6 is a simplified block diagram illustration of a typical mobile device 600 that may be used as the sender device 302 shown in FIG. 3 or FIG. 4.

To some extent, it will be posited in the following discussion, without limitation, that the mobile device 600 is a smartphone.

The mobile device 600 may include a housing 603. In many embodiments, the front of the housing 603 is predominantly constituted by a touchscreen (not separately shown), which is a key element of the user interface 604 of the mobile device 600.

The mobile device 600 further includes a mobile processor/control circuit 606, which is contained within the housing 603. Also included in the mobile device 600 is a storage/memory device or devices (reference numeral 608). The storage/memory devices 608 are in communication with the processor/control circuit 606 and may contain program instructions to control the processor/control circuit 606 to manage and perform various functions of the mobile device 600. As is well-known, a smartphone may function as what is in effect a pocket-sized personal computer, via programming with a number of application programs, or "apps", as well as a mobile operating system (OS). (The apps are represented at block 610 in FIG. 6, and may, along with other programs, in practice be stored in block 608, to program the processor/control circuit 606.) In view of the pertinence of digital wallets to the teachings of this disclosure, a digital wallet/wallet app is shown separately from the apps 610 and is represented by block 612. In many respects the wallet app 612, if present, may be similar to wallet apps that have been proposed for payment-enabled mobile phones of the type referred to above in discussing the customer device 102 of FIG. 1. However, in other embodiments, the mobile device 600 may engage in suitable functionality to access a remotely maintained digital wallet (e.g., in WSP A 304, FIG. 3) via a mobile browser (not separately shown). In some embodiments, the wallet app 612 may be employed to access the user's digital wallet hosted by the WSP A 304.

As is typical for smartphones, the mobile device 600 may include mobile communications functions as represented by block 614. The mobile communications functions may include voice and data communications via a mobile communication network (not shown) with which the mobile device 600 is registered.

If the mobile device 600 is used (or intended to potentially be used) as a payment-enabled mobile device in a payment card account system, then the mobile device may be equipped with NFC (near field communication) capabilities or the like (not represented in the drawing) to facilitate interactions between the mobile device 600 and merchant POS devices.

From the foregoing discussion, it will be appreciated that the blocks depicted in FIG. 6 as components of the mobile device 600 may in effect overlap with each other, and/or there may be functional connections among the blocks which are not explicitly shown in the drawing. It may also be assumed that, like a typical smartphone, the mobile device 600 may include a rechargeable battery (not shown) that is contained within the housing 603 and that provides electrical power to the active components of the mobile device 600.

Although the mobile device 600 has been described herein primarily as a smartphone, in other embodiments, other types of mobile devices (e.g., a tablet computer) may be used in place of a smartphone.

Figure 7:
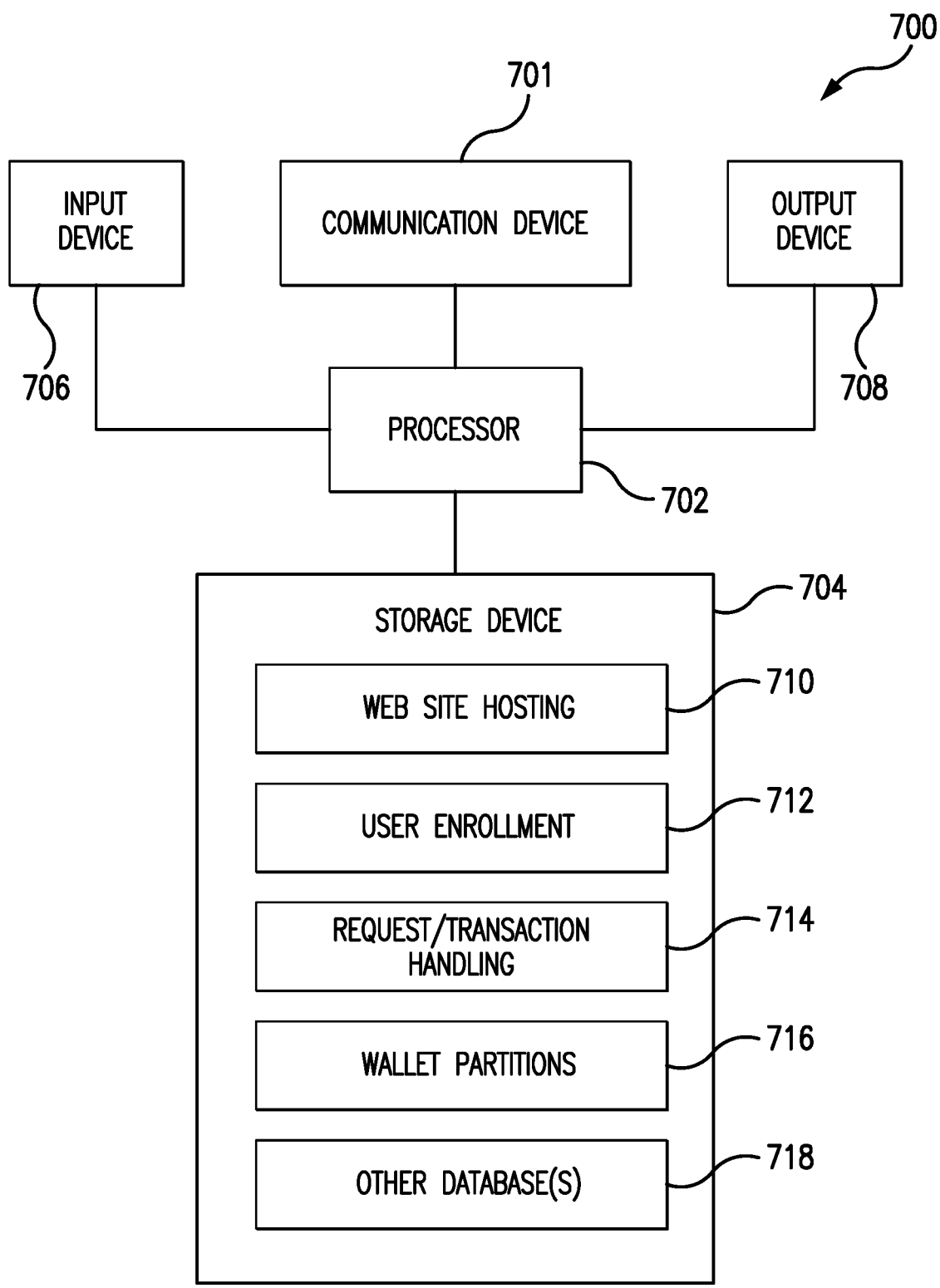
FIG. 7 illustrates an example of a wallet service provider (WSP) computer system that may perform functions in the system of FIG. 3 or FIG. 4 in accordance with some embodiments of the disclosure.

FIG. 7 is a block diagram of an example computer system 700 that may be operated by or on behalf of the WSP A 304. That is, the computer system 700 may perform and/or provide functions attributed herein to the WSP A 304. Although the computer system 700 is depicted as a stand-alone component, some or all of the functions ascribed to it may be performed by a computer system network and/or other components operated by, or associated with, the payment switch/network 206 and/or the payment card network 108. In other embodiments, the functionality of the computer system 700 may be realized by so-called "cloud computing" assets.

Referring again to FIG. 7, the computer system 700 may, in its hardware aspects, resemble a typical server computer and/or mainframe computer, but may be controlled by software to cause it to function as described herein. In addition, the computer system 700 may be designed as a special purpose computer, and thus specially configured to perform the functions described herein.

The computer system 700 may include one or more processor(s) 702 operatively coupled to a communication device 701, a storage device 704, an input device 706 and an output device 708. The communications device 701, the storage device 704, the input device 706 and the output device 708 may all be in communication with and/or operably connected to the processor(s) 702. The processor(s) 702 operate to execute processor-executable steps, contained in program instructions described below, so as to control the computer system 700 to provide desired functionality.

Communication device 701 may be used to facilitate communication with, for example, other devices (such as other components of the system 300 or 400). Communication device 701 may comprise numerous communication ports (not separately shown), to allow the computer system 700 to communicate simultaneously with a number of other computers and/or other devices, including communications as required to simultaneously handle numerous interactions with a large number of sender devices.

Input device 706 may comprise one or more of any type of peripheral device typically used to input data into a computer. For example, the input device 706 may include a keyboard and a mouse. Output device 708 may comprise, for example, a display and/or an audio speaker, and/or a printer.

Storage device 704 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory and the like. Any one or more of such information storage devices may be considered to be a non-transitory computer-readable storage medium or a computer usable medium or a memory.

Storage device 704 stores one or more programs for controlling the processor(s) 702. The programs comprise program instructions (which may be referred to as computer readable program code means) that contain processor-executable process steps of the computer system 700, executed by the processor(s) 702 to cause the computer system 700 (and/or other computer systems) to function as described herein.

The programs may include one or more conventional operating systems (not shown) that control the processor(s) 702 so as to manage and coordinate activities and sharing of resources in the computer system 700, and to serve as a host for application programs (described below) that run on the computer system 700.

The programs stored in the storage device 704 may include, for example, website hosting software 710. The website hosting software 710 may program the computer system 700 to provide a user-accessible website to serve needs of consumers who store their digital wallets with the WSP A 304 (i.e., on the computer system 700).

Another program that may be stored in the storage device 704 is a user enrollment application program 712. The user enrollment application program 712 may control the computer system 700 to guide prospective clients through an enrollment process whereby the prospective clients enroll with the WSP A 304 and set up their digital wallets on the computer system 700.

The storage device 704 may further store a request/transaction handling application program 714. The request/application handling program application program 714 may control the computer system 700 so as to provide functionality as described herein with respect to transaction senders' requests and associated funds transfer transactions.

The storage device 704 may also store, and the processor(s) 702 may also execute, other programs, which are not shown. For example, such programs may include communications software and one or more reporting applications. The latter program(s) may respond to requests from system administrators, for example, for reports on the activities performed by the computer system 700. The other programs may also include, for example, device drivers, database management software, and the like.

The storage device 704 may also store one or more databases. One such database is indicated at 716 in the drawing, and may perform the function of storing the individual dedicated wallet partitions which each respectively store a digital wallet for a user. As will be appreciated by those who are skilled in the art, the digital wallets may include features such as those described above in connection with FIG. 5. Moreover, the digital wallets may store financial account data (e.g., payment card account numbers and related data), and also may store other data, such as identification data that identifies the user for building/facility access applications, customer loyalty account data, etc.

Block 718 represents other databases that may be required for operation of the computer system 700 and that may accordingly be stored in the storage device 704.

It should be understood that each block in FIG. 3 or FIG. 4 that represents an entity may also represent a computer system operated by or on behalf of such entity to provide the described functionality of such entity. Each such computerized component of the system 300 or 400 may be constituted by computer hardware having the same type of components and/or hardware architecture as described herein with reference to FIG. 7.

Figure 8:
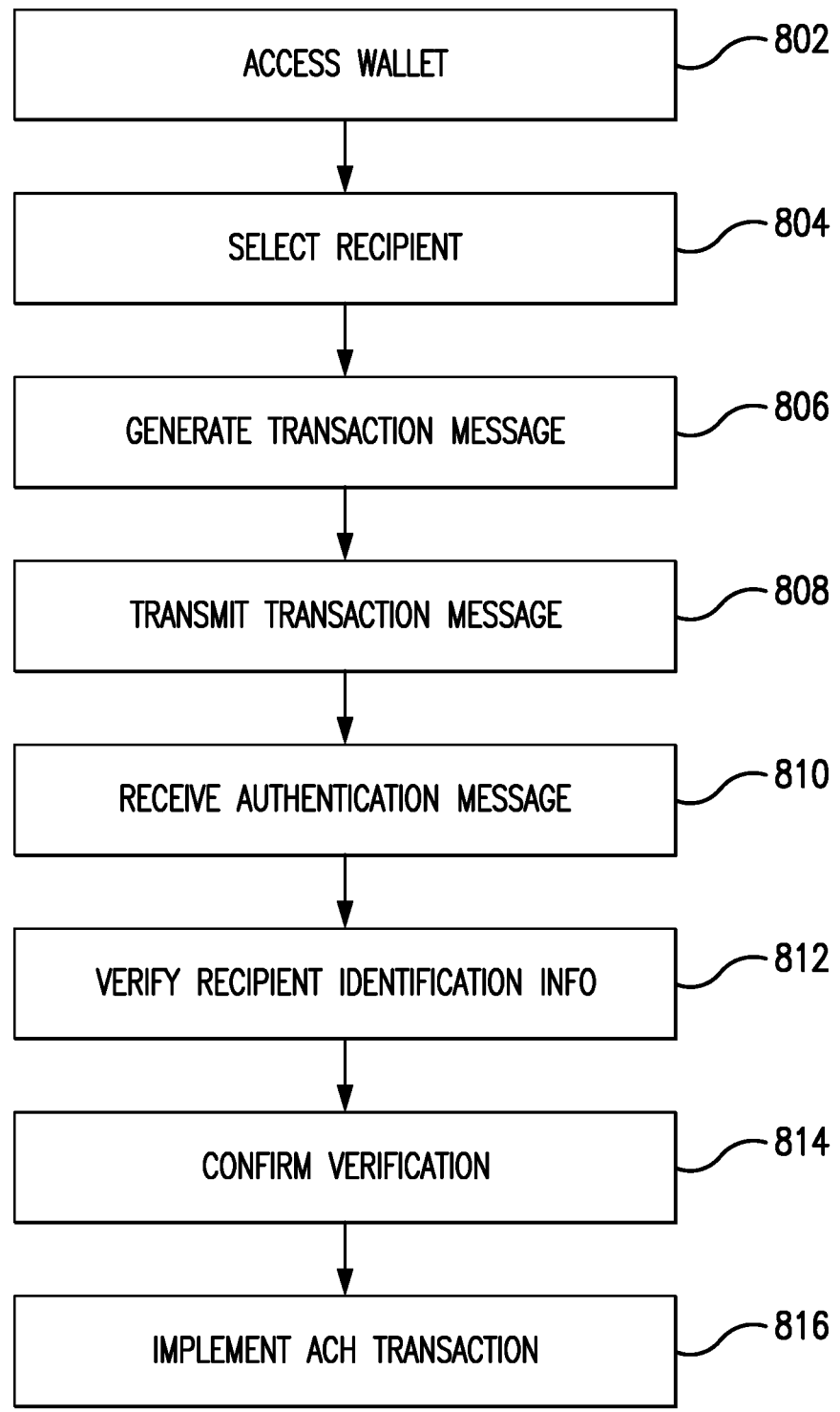
FIGS. 8 and 9 are flowcharts illustrating processes that may be performed in the system of FIG. 3 or FIG. 4 in accordance with some embodiments of the disclosure.

FIG. 8 is a flow chart that illustrates a process for a funds transfer transaction that may be performed in the system 300 or 400 according to aspects of the present disclosure.

At 802 in FIG. 8, the prospective sender of funds may access his/her digital wallet. From discussion above, it will be appreciated that this may involve interacting with the WSP A 304 via the sender device 302. Alternatively, if the digital wallet is maintained locally, then the sender may access his/her digital wallet by launching the wallet app on his/her sender device 302 and requesting that the digital wallet be opened.

At 804, the sender may provide input to select the proposed recipient for the funds transfer. In some cases, this may involve selecting the recipient from a list of recipients previously stored for the sender in the sender device 302 or on the wallet partition for the sender maintained by the WSP A 304. In some cases, selection of the recipient may bring up a previously stored ACH token for the sender. In some embodiments, the sender may select an ACH transaction in connection with this step or inherently by selecting the recipient's ACH token. By selecting an ACH transaction, the sender may select his/her ACH token as the sender's identification for the ensuing funds transfer transaction.

In other situations, the sender may indicate selection of the recipient by entering an ACH token for the recipient, where the recipient's ACH token has been communicated to the sender by some means of communication, such as orally in person or by phone, in writing, or via a messaging system such as email or mobile device texting. In such situations, the sender may enter the recipient's ACH token character-by-character/digit-by-digit via the user interface of the sender device 302. Alternatively, the sender may enter the recipient's ACH token by a cut-and-paste operation.

At 806, a transaction message is generated. This may occur in response to the sender's interaction with the sender's device and may take place within the sender's device and/or partially or wholly within the WSP A 304. The transaction message may identify the transaction recipient by his/her ACH token. During this process, the sender may specify the amount of the proposed funds transfer, and this amount may be included in the transaction message. At 808 the transaction message is transmitted from the device which generated the transaction message. The entity to which the transaction message is transmitted may be an entity that maintains a token directory in which the recipient's ACH token is listed. In some embodiments and/or in some situations, the token directory may be stored in the WSP A 304 or in another WSP (such as WSP B 312). In some embodiments and/or in some situations, the token directory may be associated with the payment card network 108 (FIG. 4) and the transaction message may be routed to the payment card network 108 via facilities of a payment card account system.

The recipient token may be used as routing information in connection with the transmission of the transaction message. For example, the recipient token may be used to route the transaction message to the payment card network. In some embodiments, the ACH tokens referred to herein may be in the same format as a payment card account number in a payment card account system. In some embodiments, the transaction message may be routed to another entity via the payment card network 108.

At 810, an authentication message is received. It may be received, for example, at the sender device 302. The authentication message may have been originated from the entity that maintains the token directory. The authentication message may contain the name and residence address of the individual who is associated in the token directory with the recipient ACH token that was included in the transaction message transmitted at 808. If the name and address of the recipient, as contained in the authentication message, matches the sender's intended recipient, then the authentication message has the effect of authenticating the accuracy of the recipient ACH token that was included in the transaction method. This may aid in detecting errors made by senders in designating recipients, and may prevent such errors from resulting in erroneous ACH transactions.

At 812, the sender may read the recipient name, phone number, e-mail address and/or postal address as contained in the authentication message to verify that the recipient has been properly identified. In order for this to occur, the recipient's name and address, etc.—as received in the authentication message—may be displayed on the user interface of the sender device 302. The display of the recipient's facial image can also be helpful. A "selfie" image, in combination with other recipient-specific information (i.e., phone number and -mail address) can be used to generate a new token.

At 814 (and assuming that the displayed recipient name and address are correct), the sender may interact with the sender device 302 to confirm verification of the recipient, thereby indicating that the ACH transaction is to proceed.

Following block 814 is block 816. At block 816, the proposed ACH funds transfer may be implemented. This may involve a message transmitted to the sender PSP 306 (which may be associated with or overlap with the WSP A, in some embodiments) identifying the sender by his/her ACH token, and the recipient by his/her ACH token and also indicating the amount of the desired funds transfer. In a suitable manner, the sender and recipient ACH tokens may be translated into the respective bank account information for the sender and the recipient, and the transfer may proceed accordingly in the manner of a typical ACH transaction as referred to above in connection with FIG. 2.

In some embodiments, the process of FIG. 8 may also include device-to-device authentication, e.g., between the sender device 302 and a device (not shown) operated by the recipient. In some embodiments, device-to-device authentication may be performed between the sender WSP and the recipient WSP.

Figure 9:
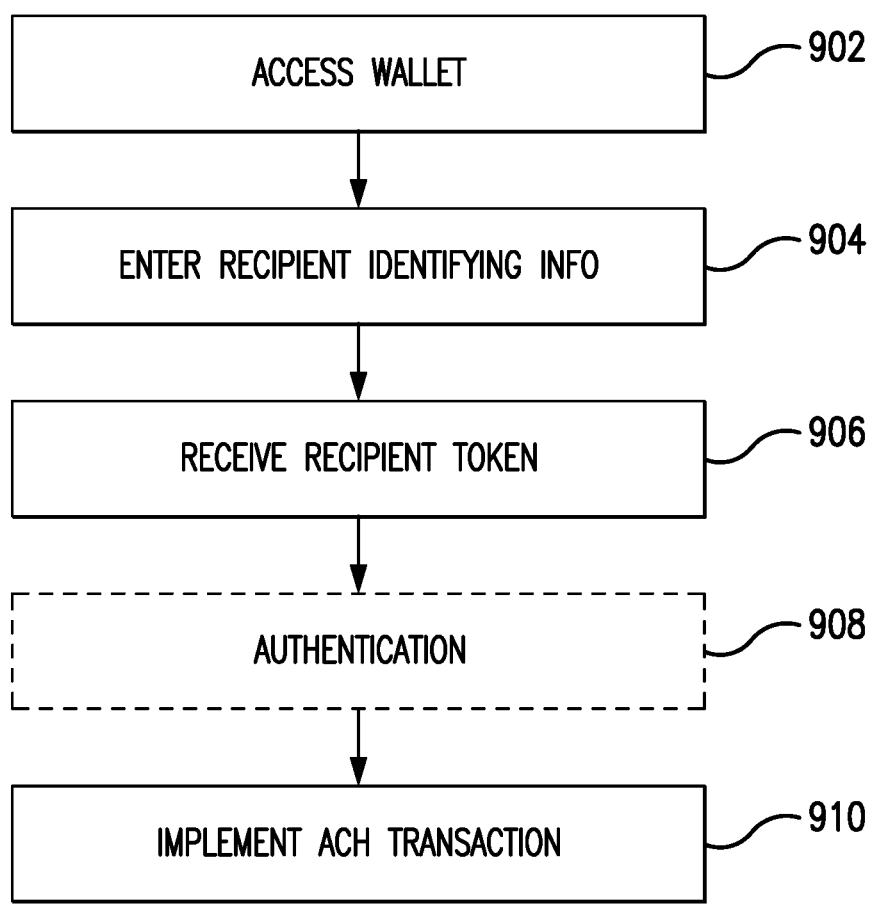

FIG. 9 is a flow chart that illustrates another process for a funds transfer transaction that may be performed in the system 300 or 400 according to aspects of the present disclosure.

At 902 in FIG. 9, the prospective sender of funds may access his/her digital wallet. The above description of block 802 in FIG. 8 may also be applicable to this block 902.

At block 904, the sender may interact with the sender device 302 to enter the name and address (or other identifying information) for the proposed recipient of the funds transfer.

As part of 902 or 904, the sender may indicate selection of ACH as the mode of transfer for the desired transaction. By doing so, the sender may select his/her ACH token as the sender identification and specific account for the transaction.

At block 906, by suitable messaging, the sender device 302 (or the WSP A 304, on the sender's behalf) may receive the recipient's ACH token—that is, the ACH token associated in a token directory with the individual recipient identified by the sender at 904. The messaging may include transmitting and/or routing a token request message to the token directory. The token request message may include the recipient name and address as entered by the sender. A response message that includes the requested recipient ACH token may then be transmitted/routed from the token directory to the sender device 302 and/or the WSP A 304. In some embodiments, or in some situations, the WSP A 304 may be the source of the recipient ACH token (e.g., where the sender and recipient both maintain their digital wallets with the WSP A 304).

Optionally, as indicated at 908, device-to-device authentication may take place.

At 910, the ACH transaction may be implemented using the recipient ACH token returned to the sender at 906. As noted above in connection with block 816 of FIG. 8, the sender's ACH token may also be employed. In general, execution of this block 910 of FIG. 9 may be in accordance with the above description of block 816.

With processes as described herein, senders may readily access ACH functionality via their digital wallets, with a high degree of assurance that the resulting ACH transaction will not be misdirected due to potential error in identifying the transaction recipient by the recipient's ACH token.

As noted above, in some situations, the sender and recipient may be closely related, such as parent-and-child. The child's token may represent a sub-account of the bank account represented by the parent's token. The parent may be enabled to apply controls on debit card account transactions from the child's subaccount. For example, the controls may limit transactions from the child's subaccount to purchases in a college bookstore and from a college cafeteria. In addition or alternatively, the controls may forbid undesirable purchases, such as from fast food outlets or liquor stores. In addition or alternatively, the parent may receive periodic and/or real-time reports of spending from the child's subaccount.

In transactions described herein, the ACH transaction causes funds to be transferred from a sender's account to a recipient's account. The sender's account and the recipient's account may both be bank deposit accounts, such as checking or savings accounts. In addition or alternatively, the sender's and/or recipient's account may be an investment account.

In addition to P2P ACH transactions as described herein, the system 400 may also support P2P funds transfers from a sender's payment card system account to a recipient's payment card system account.

Throughout this disclosure, examples of financial transactions are described, which are not to be taken as limiting. In addition, a number of terms are used, the use of which terms is not intended to be limiting, but rather the terms are used for convenience and ease of exposition. For example, as used herein, the term "user" may be used interchangeably with the term "consumer" and/or the with the term "cardholder" and these terms are used herein to refer to a person, individual, consumer, customer, company, business or other entity that owns (or is authorized to use) a financial account such as a bank account (i.e., a savings account and/or a checking account and/or virtual currency account) or payment card account (i.e., a credit card account, debit card account, or pre-paid card account) or some other type of financial account (such as a brokerage account, loyalty card account, and/or mass transit access account). In addition, the term "payment card account" may include a credit card account, a debit card account, and/or a deposit account or other type of financial account that an account holder or cardholder may access. The term "payment card account number" includes a number that identifies a payment card system account or a number carried by a payment card, and/or a number that is used to route a transaction in a payment system that handles debit card and/or credit card transactions and the like. Moreover, as used herein the terms "payment card system" or "payment card account system" refer to a system and/or network for processing and/or handling purchase transactions and related transactions, which may be operated by a payment card system operator such as Mastercard International Incorporated, or a similar system. In some embodiments, the term "payment card system" may be limited to systems in which member financial institutions (such as banks) issue payment card accounts to individuals, businesses and/or other entities or organizations (and thus are known as issuer financial institutions or issuer banks).

The above descriptions and illustrations of processes herein should not be considered to imply a fixed order for performing the process steps. Rather, the process steps may be performed in any order that is practicable, including the omission of one or more steps and/or the simultaneous performance of at least some steps.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

Although the present invention has been described in connection with specific exemplary embodiments, it should be understood that various changes, substitutions, and alterations would be apparent to those skilled in the art and can be made to the disclosed embodiments without departing from the spirit and scope of the invention as set forth in the appended claims.

What is claimed is:

1. A method comprising:
providing a digital wallet for a sender;
receiving, at the sender, a recipient token;
selecting a recipient account associated with the recipient token;
generating, by the sender, a message to initiate an ACH (automated clearing house) transaction to benefit the recipient account associated with the recipient token, the message including the received recipient token;
transmitting the message, wherein the recipient token includes routing information to route the message and wherein the association between the recipient account and the recipient token is stored in a token directory, and wherein the token directory is associated with a payment card network;

receiving an authentication message indicative of authentication of the recipient token; and causing the performance of said ACH transaction in response to receiving the authentication message.

2. The method of claim 1, wherein the authentication message includes identification information that identifies an individual to whom the recipient token was issued.

3. The method of claim 2, wherein the causing the performance step includes indicating confirmation in response to receiving the identification information.

4. The method of claim 2, wherein the identification information includes the individual's name and/or residence address and/or phone number and/or a facial image of the recipient.

5. The method of claim 1, wherein the recipient account is a bank deposit account.

6. The method of claim 1, wherein the transmitting step includes sending the message via a payment card account network.

7. The method of claim 1, wherein the ACH transaction is for transferring funds from a sender account to the recipient account, the sender account associated with a sender token.

8. The method of claim 7, wherein the generating step includes accessing the sender token via the digital wallet.

9. The method of claim 8, wherein:
the digital wallet is a first digital wallet; and
the authentication message is received by the first digital wallet from a second digital wallet, the second digital wallet associated with the recipient token.

10. The method of claim 9, wherein the message to initiate the ACH transaction includes the sender token.

11. A method comprising:
providing a digital wallet for a sender;
transmitting a token request message from the sender to request a recipient token;
receiving, at the sender, the recipient token in response to the token request message, wherein the recipient token is associated with a recipient account;
selecting the recipient account associated with the recipient token;
initiating an ACH (automated clearing house) transaction to transfer funds to a bank deposit account associated with the received recipient token, wherein selection of the recipient account automatically initiates the ACH transaction; and
transmitting a transaction message to transfer the funds, the transaction message including the received recipient token, wherein the received recipient token includes routing information to route the transaction message and wherein the association between the recipient account and the recipient token is stored in a token directory, and wherein the token directory is associated with a payment card network.

12. The method of claim 11, wherein the token request message includes identification information that identifies an individual who owns the bank deposit account.

13. The method of claim 12, wherein the identification information includes the individual's name and/or residence address.

14. The method of claim 11, wherein:
the bank deposit account is a recipient account; and
the ACH transaction is for transferring funds from a sender account to the recipient account, the sender account associated with a sender token.

15. The method of claim 14, wherein the transmitting step includes accessing the sender token via the digital wallet.

16. An apparatus comprising:
a processor; and
a memory in communication with the processor, the memory storing program instructions, the processor operative with the program instructions to perform functions as follows:
receiving, at a sender, a recipient token;
selecting a recipient account associated with the recipient token;
generating, by the sender, a message to initiate an ACH (automated clearing house) transaction to benefit the recipient account associated with the recipient token, the message including the received recipient token;
transmitting the message, wherein the recipient token includes routing information to route the message and wherein the association between the recipient account and the recipient token is stored in a token directory, and wherein the token directory is associated with a payment card network;
receiving an authentication message indicative of authentication of the recipient token; and
causing the performance of said ACH transaction in response to receiving the authentication message.

17. The apparatus of claim 16, wherein the authentication message includes identification information that identifies an individual to whom the recipient token was issued.

18. The apparatus of claim 17, wherein the causing the performance function includes indicating confirmation in response to receiving the identification information.

19. The apparatus of claim 17, wherein the identification information includes the individual's name and/or residence address and/or phone number and/or a facial image of the recipient.

20. The apparatus of claim 16, wherein the recipient account is a bank deposit account.

* * * * *